United States Patent
Ghosh et al.

(10) Patent No.: US 9,445,362 B2
(45) Date of Patent: Sep. 13, 2016

(54) SOLVING EXPOSED TERMINAL PROBLEMS IN WIRELESS NETWORKS

(71) Applicant: Nokia Technologies Oy, Espoo (FI)

(72) Inventors: Chittabrata Ghosh, Fremont, CA (US); Sayantan Choudhury, Berkeley, CA (US)

(73) Assignee: Nokia Technologies Oy, Espoo (FI)

( * ) Notice: Subject to any disclaimer, the term of this patent is extended or adjusted under 35 U.S.C. 154(b) by 208 days.

(21) Appl. No.: 14/104,337

(22) Filed: Dec. 12, 2013

(65) Prior Publication Data

US 2015/0173010 A1 Jun. 18, 2015

(51) Int. Cl.
*G08C 17/00* (2006.01)
*H04W 48/20* (2009.01)
*H04W 52/02* (2009.01)

(52) U.S. Cl.
CPC ............ *H04W 48/20* (2013.01); *H04W 52/02* (2013.01)

(58) Field of Classification Search
USPC ....... 370/338, 311, 331, 252, 310, 312, 328, 370/395.1; 455/41.2, 422.1, 435.1, 436, 455/127.5, 419, 432.1, 434, 442, 450, 455/456.1, 552.1, 553.1, 74.1
See application file for complete search history.

(56) References Cited

U.S. PATENT DOCUMENTS

| | | | | |
|---|---|---|---|---|
| 7,565,162 B2 * | 7/2009 | Adachi | ................... | H01Q 1/246 370/332 |
| 7,613,475 B2 * | 11/2009 | Song | ................... | H04W 52/325 370/338 |
| 8,971,229 B1 * | 3/2015 | Yenganti | ........... | H04W 52/0216 370/311 |
| 9,137,778 B2 * | 9/2015 | Merlin | ............... | H04W 52/0209 |
| 2005/0232200 A1 * | 10/2005 | Jeong | ................ | H04W 52/0216 370/331 |
| 2006/0040663 A1 * | 2/2006 | Ise | ......................... | H04W 88/08 455/434 |
| 2007/0159992 A1 * | 7/2007 | Kim | ................... | H04W 52/0216 370/311 |
| 2009/0061799 A1 * | 3/2009 | Park | ................... | H04W 52/0258 455/127.5 |
| 2012/0155308 A1 * | 6/2012 | Lee | ....................... | H04W 24/00 370/252 |
| 2014/0092797 A1 * | 4/2014 | Chu | .................. | H04W 52/0216 370/311 |
| 2014/0133530 A1 * | 5/2014 | Maguire | .................. | H04B 1/38 375/219 |
| 2014/0328238 A1 * | 11/2014 | Seok | ..................... | H04W 74/04 370/311 |

OTHER PUBLICATIONS

Smith, "Dynamic Sensitivity Control for HEW SG", IEEE 802.11-13/1290r0, Nov. 2013, pp. 1-21.
IEEE P802.11-REVmcTM/D1.6, Sep. 2013.
IEEE P802.11 ah/D1.0, Oct. 2013.

\* cited by examiner

*Primary Examiner* — Phuongchau Ba Nguyen
(74) *Attorney, Agent, or Firm* — Harrington & Smith

(57) ABSTRACT

Methods, apparatus and program products are disclosed for allowing wireless devices in two wireless access networks whose coverage areas overlap to communicate with their respective access nodes. Groups may be assigned to wireless devices in the access networks and the groups may be used by wireless devices in the access networks to determine whether to access a communication medium or not. Received powers may also be used by wireless devices in the access networks to determine whether or not to access a communication medium. A wireless device in a first access network can determine whether to access (e.g., compete for access to) the communication medium by comparing a measured power of transmission from a second access node with an indication of a minimum received power above which wireless devices in a second access network formed by a second access node are allowed to contend for access to the communication medium.

20 Claims, 10 Drawing Sheets

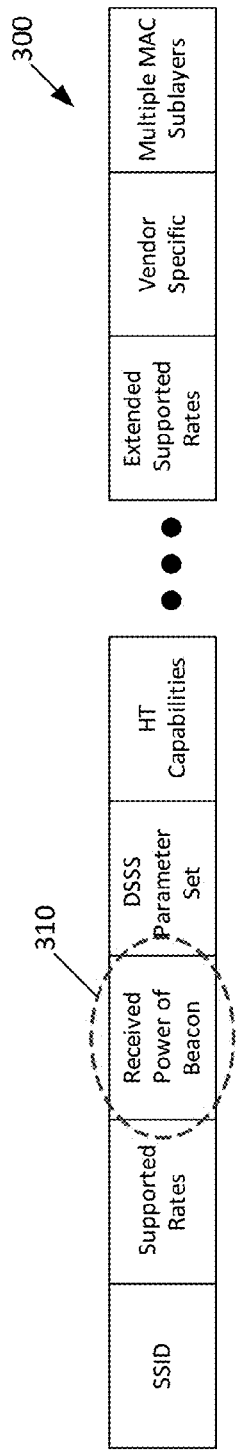
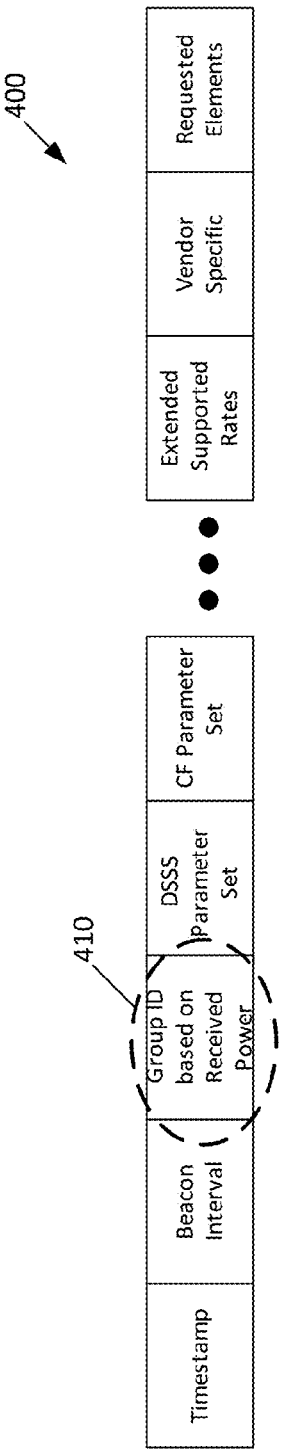
FIG. 3
FIG. 4

SOLVING EXPOSED TERMINAL PROBLEMS IN WIRELESS NETWORKS

TECHNICAL FIELD

This invention relates generally to wireless networks such as wireless networks and, more specifically, relates to wireless regions that overlap and that are controlled by access points.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

A future WiFi network, termed a High Efficiency WLAN (HEW) in an IEEE Study Group, envisions higher data rates of 10 Gbps but is expected to be deployed with very dense nodes such as STAs. Recent discussions in the Study Group suggest much of the energy is wasted in receiving management frames like Beacons and Probe Response frames.

Due to the dense deployment of nodes in HEW, there is a high probability of experiencing an "exposed terminal" problem. That is, with two nodes, each associated to only one AP within a BSS, one node in a BSS may be able to hear (e.g., is exposed to) transmissions from another node or the AP in another BSS and continue to back-off, instead of accessing the WiFi communication medium (e.g., a spectrum including one or more channels). Since WiFi is a contention-based system were two nodes such as STAs contend for the communication medium, this means the one node is backing off from contending for the communication medium even though there is no need to do so, since each STA is within a BSS and should be able to communicate within that BSS. This exposed terminal problem may be pronounced with increasing number of nodes getting exposed to transmissions from proximal nodes in another BSS.

SUMMARY

This section contains examples of possible implementations and is not meant to be limiting. It should be noted, for instance, that wireless local area networks are used as examples below. Wireless local area networks are only an example background area and similar needs may exist in other existing or future contention-based wireless networks.

In an exemplary embodiment, a method includes transmitting a first frame from an access node of a first access network having a first coverage area to a wireless device. The method includes receiving a second frame from the wireless device indicating a reception power of the first frame and determining a group for the wireless device based at least partly on the indicated reception power. The method includes transmitting a third frame to the wireless device indicating the determined group. The method includes receiving a fourth frame from a second access network having a second coverage area that overlaps with the first coverage area. The fourth frame indicates that communication medium access by wireless devices in the second access network is confined to a subset of wireless devices of the second access network wherein the subset has a third coverage area smaller than the second coverage area and indicates a period during which the those wireless devices in the second access network are able to access the communication medium. The method includes determining that wireless devices within the group are allowed to use, during the period, the communication medium simultaneously with use of the communication medium by those wireless devices in the second access network. The method further includes transmitting a broadcast frame that indicates that wireless devices within the group are allowed to use the communication medium during the period.

In an additional exemplary embodiment, a computer program product comprises a computer-readable storage medium bearing computer program code embodied therein for use with a computer. The computer program code comprises: code for transmitting a first frame from an access node of a first access network having a first coverage area to a wireless device; code for receiving a second frame from the wireless device indicating a reception power of the first frame; code for determining a group for the wireless device based at least partly on the indicated reception power; code for transmitting a third frame to the wireless device indicating the determined group; code for receiving a fourth frame from a second access network having a second coverage area that overlaps with the first coverage area, the fourth frame indicating that communication medium access by wireless devices in the second access network is confined to a subset of wireless devices of the second access network wherein the subset has a third coverage area smaller than the second coverage area and indicating a period during which the those wireless devices in the second access network are able to access the communication medium; code for determining that wireless devices within the group are allowed to use, during the period, the communication medium simultaneously with use of the communication medium by those wireless devices in the second access network; and code for transmitting a broadcast frame that indicates that wireless devices within the group are allowed to use the communication medium during the period.

In another exemplary embodiment, an apparatus comprises: means for transmitting a first frame from an access node of a first access network having a first coverage area to a wireless device; means for receiving a second frame from the wireless device indicating a reception power of the first frame; means for determining a group for the wireless device based at least partly on the indicated reception power; means for transmitting a third frame to the wireless device indicating the determined group; means for receiving a fourth frame from a second access network having a second coverage area that overlaps with the first coverage area, the fourth frame indicating that communication medium access by wireless devices in the second access network is confined to a subset of wireless devices of the second access network wherein the subset has a third coverage area smaller than the second coverage area and indicating a period during which the those wireless devices in the second access network are able to access the communication medium; means for determining that wireless devices within the group are allowed to use, during the period, the communication medium simultaneously with use of the communication medium by those wireless devices in the second access network; and means for transmitting a broadcast frame that indicates that wireless devices within the group are allowed to use the communication medium during the period.

In a further exemplary embodiment, an apparatus includes one or more processors and one or more memories including computer program code. The one or more memories and the computer program code configured, with the one or more processors, to cause the apparatus to perform at least the following: transmitting a first frame from an access node of a first access network having a first coverage area to a wireless device; receiving a second frame from the wireless device indicating a reception power of the first frame; determining a group for the wireless device based at least partly on the indicated reception power; transmitting a third frame to the wireless device indicating the determined group; receiving a fourth frame from a second access network having a second coverage area that overlaps with the first coverage area, the fourth frame indicating that communication medium access by wireless devices in the second access network is confined to a subset of wireless devices of the second access network wherein the subset has a third coverage area smaller than the second coverage area and indicating a period during which the those wireless devices in the second access network are able to access the communication medium; determining that wireless devices within the group are allowed to use, during the period, the communication medium simultaneously with use of the communication medium by those wireless devices in the second access network; and transmitting a broadcast frame that indicates that wireless devices within the group are allowed to use the communication medium during the period.

In another exemplary embodiment, a method includes receiving at a wireless device a first frame from an access node and transmitting a second frame from the wireless device toward the access node indicating a reception power of the first frame. The method includes receiving a third frame from the access node indicating an assigned group and receiving a broadcast frame that indicates a period and that indicates wireless devices within one or more groups are allowed to contend for access to a communication medium during the period. The method further includes determining whether the assigned group is the same as one of the one or more groups and based on the determining, one of contending or not contending for access to the communication medium during the period.

In an additional exemplary embodiment, an apparatus includes: means for receiving at a wireless device a first frame from an access node; means for transmitting a second frame from the wireless device toward the access node indicating a reception power of the first frame; means for receiving a third frame from the access node indicating an assigned group; means for receiving a broadcast frame that indicates a period and that indicates wireless devices within one or more groups are allowed to contend for access to a communication medium during the period; means for determining whether the assigned group is the same as one of the one or more groups; and means for based on the determining, one of contending or not contending for access to the communication medium during the period.

In an additional exemplary embodiment, a computer program product comprises a computer-readable storage medium bearing computer program code embodied therein for use with a computer. The computer program code comprises: code for receiving at a wireless device a first frame from an access node; code for transmitting a second frame from the wireless device toward the access node indicating a reception power of the first frame; code for receiving a third frame from the access node indicating an assigned group; code for receiving a broadcast frame that indicates a period and that indicates wireless devices within one or more groups are allowed to contend for access to a communication medium during the period; code for determining whether the assigned group is the same as one of the one or more groups; and code for based on the determining, one of contending or not contending for access to the communication medium during the period.

In a further exemplary embodiment, an apparatus includes one or more processors and one or more memories including computer program code. The one or more memories and the computer program code configured, with the one or more processors, to cause the apparatus to perform at least the following: receiving at a wireless device a first frame from an access node; transmitting a second frame from the wireless device toward the access node indicating a reception power of the first frame; receiving a third frame from the access node indicating an assigned group; receiving a broadcast frame that indicates a period and that indicates wireless devices within one or more groups are allowed to contend for access to a communication medium during the period; determining whether the assigned group is the same as one of the one or more groups; and based on the determining, one of contending or not contending for access to the communication medium during the period.

A further exemplary embodiment is a method comprising receiving, at a wireless device in a first access network formed by a first access node, from a second access node a broadcast frame that indicates a minimum received power above which wireless devices in a second access network formed by the second access node are allowed to contend for access to a communication medium. The method further comprises, based on a comparison of measured power of transmission from the second access node with the minimum received power, one of contending for access to the communication medium or not contending for access to the communication medium.

An exemplary apparatus comprises: means for receiving, at a wireless device in a first access network formed by a first access node, from a second access node a broadcast frame that indicates a minimum received power above which wireless devices in a second access network formed by the second access node are allowed to contend for access to a communication medium; and means for based on a comparison of measured power of transmission from the second access node with the minimum received power, one of contending for access to the communication medium or not contending for access to the communication medium.

In an additional exemplary embodiment, a computer program product comprises a computer-readable storage medium bearing computer program code embodied therein for use with a computer. The computer program code comprises: receiving, at a wireless device in a first access network formed by a first access node, from a second access node a broadcast frame that indicates a minimum received power above which wireless devices in a second access network formed by the second access node are allowed to contend for access to a communication medium; and based on a comparison of measured power of transmission from the second access node with the minimum received power, one of contending for access to the communication medium or not contending for access to the communication medium.

In a further exemplary embodiment, an apparatus includes one or more processors and one or more memories including computer program code. The one or more memories and the computer program code configured, with the one or more processors, to cause the apparatus to perform at least the following: receiving, at a wireless device in a first access network formed by a first access node, from a second access node a broadcast frame that indicates a minimum received power above which wireless devices in a second access network formed by the second access node are allowed to contend for access to a communication medium; and based on a comparison of measured power of transmission from the second access node with the minimum received power, one of contending for access to the communication medium or not contending for access to the communication medium.

BRIEF DESCRIPTION OF THE DRAWINGS

In the attached Drawing Figures:

FIG. 3 shows a Probe Request frame format with an exemplary proposed field "Received Power of beacon" sent by a STA;

FIG. 4 shows a Probe Response frame format with an exemplary proposed field "Group ID based on Received Power" sent by an AP;

DETAILED DESCRIPTION OF THE DRAWINGS

Figure 1:
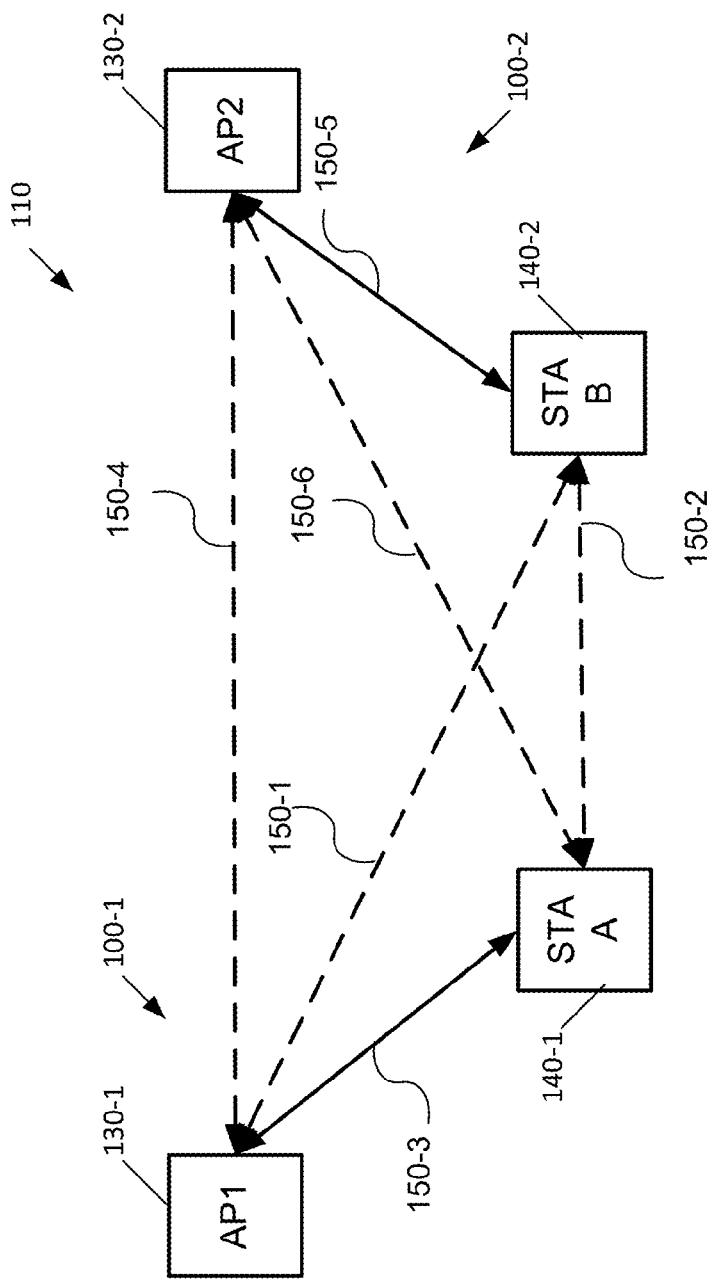
FIG. 1 is an example of a system configuration with two BSSs that might cause an exposed terminal problem.

As stated above, there is an exposed terminal problem that may be pronounced with increasing number of nodes getting exposed to transmissions from proximal nodes in another BSS. It is worthwhile to describe this issue in more detail. FIG. 1 is an example of a system 110 with a system configuration with two BSSs 100 that might cause an exposed terminal problem. BSS 100-1 includes the AP1 130-1 and the STA A 140-1. The BSS 100-2 includes the AP2 130-2 and the STA B 140-2. Parts of FIG. 1 and some of the description of FIG. 1 is based on an IEEE presentation by G. Smith, "Dynamic Sensitivity Control for HEW SG," IEEE 802.11-13/1290r0, November 2013.

The power from STA A 140-1 to AP1 130-1 on link 150-3 (or from STA B 140-2 to AP2 130-2 on link 150-5) is assumed to be relatively high (e.g., −50 dBm). Note that the two APs 130 may receive each other's transmissions via link 150-4, and the received power is expected to be relatively (e.g., −82 dBm) low due to the distance between the two APs. The STA A 140-1 may also receive AP1's transmissions via link 150-6. The STA B 140-2 is assumed to be four times as far from the AP1 130-1 as STA A 140-1 is assumed to be from the AP1 130-1. It is further assumed that there is a certain loss due to distance. The total power received at the AP1 130-1 from the STA B 140-2 via link 150-1 will therefore be multiples less, due to the distances between AP1 and STAs A and B, than the total power received at the AP1 130-1 from the STA A 140-1 via link 150-3. The STA A 140-1 receives a transmission via link 150-2 from the STA B, and since the STA B is closer to the STA A than the STA B is to the APE the STA A will receive a higher power from the STA B than the AP1 will receive from the STA B.

Because of this system configuration, the STAs 140 will receive each other's transmissions. Each STA may therefore be prevented by CCA to access the communication medium. That is, what is meant by prevention by CCA is that prior to communication medium access, STAs in WiFi need to sense for the idle communication medium (i.e., listen before talk). In this system configuration, STAs A and B are exposed to each other and neither can transmit since each STA hears each other's transmissions, which is an exposed terminal problem.

The presenter for the above-referenced IEEE presentation proposed in the presentation defining dynamic receiver sensitivity thresholds with fading margins, resulting in smaller transmission ranges for BSSs and reduced exposed terminal problem. However, such a solution may result in lack of fairness among nodes in a BSS, providing some nodes higher communication medium access probability over others. Moreover, for cell edge users with reduced received power even from their own AP, such a dynamic adjustment of receiver sensitivity threshold may result in missing Beacons even from the associated AP.

By contrast, exemplary techniques are proposed herein to solve the exposed terminal problem within two neighboring and overlapping BSSs. An exemplary technique involves measuring at each STA the received power of a Beacon transmitted by its associated AP and reporting the values to the AP. Based on a range of proximal values of received power, the AP assigns a Group ID to each of the associated STAs. Intuitively speaking, STAs with high received power will be assigned a group located very close to the AP, while STAs with low received power may be assigned a group located far away from the AP. The same method is followed by an AP in an adjacent BSS. Furthermore, techniques are also proposed for resource allocation among multiple adjacent BSSs such that STAs in one group within a BSS may simultaneously access the communication medium along with STAs in another group within an adjacent BSS.

Figure 2:
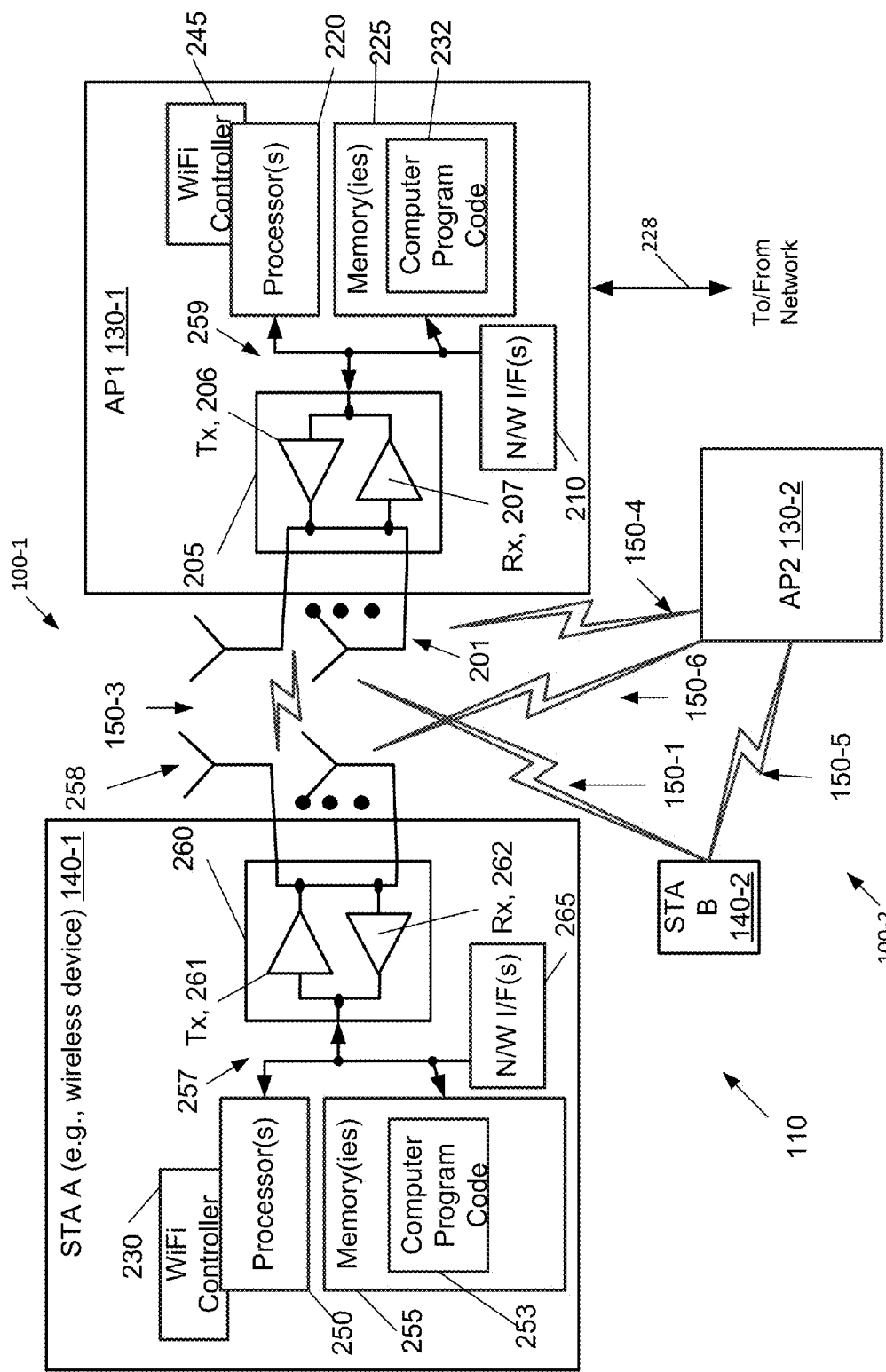
FIG. 2 is a block diagram of an exemplary wireless system suitable for use with the techniques presented herein.

Before proceeding with additional description of these techniques, reference is made to FIG. 2 for an example of a wireless system (e.g., a WiFi system) 110 suitable for use with the techniques. The two STAs 140-1 and 140-2 are assumed to be similar and only possible internal implementation of the STA 240-1 is described. Similarly, the two APs 130-1 and 130-2 are assumed to be similar and only possible internal implementation of the AP 130-1 is described.

The STA 140-1 is a wireless device that includes one or more processors 250, one or more memories 255, one or more transceivers 260, and one or more network (N/W) interfaces (I/Fs) 265, interconnected through one or more buses 257. The STA 140-1 includes one or more antennas 258. The one or more memories 255 include computer program code 253. Each of one or more transceivers 260 includes one or more transmitters (Tx) 261 and one or more receivers (Rx) 262. The STA 140-1 includes a WiFi controller 230, which causes the STA 140-1 to perform at least the techniques presented herein. In an exemplary embodiment, the WiFi controller 230 may be implemented (in part or wholly) as computer program code 253, such that the one or more memories 255 and the computer program code 253 are configured, with the one or more processors 250, to cause the STA 240-1 to perform techniques presented herein. In another exemplary embodiment, the WiFi controller 230 may be (in part or wholly) implemented as hardware logic, such as being implemented in an integrated circuit, programmable logic device, or the like. The hardware logic may be part of the one or more processors 250 or be separate circuitry. The one or more buses 257 may be any type of connection, such as traces on a motherboard, lines on a semiconductor, fiber optics, wireless connections, and the like.

The AP 130-1 includes one or more processors 220, one or more memories 225, one or more network interfaces (N/W I/F(s)) 210, and one or more transceivers 205 (each comprising one or more transmitters, Tx, 206 and/or one or more receivers, Rx, 207) interconnected through one or more buses 259. The one or more transceivers are connected to the one more antennas 201. The one or more buses 259 may be any type of connection, such as traces on a motherboard, lines on a semiconductor, fiber optics, wireless connections, and the like. The one or more memories 225 include computer program code 232. The AP 130-1 includes a WiFi controller 245, which causes the AP 130 to perform at least the techniques presented herein. In an exemplary embodiment, the WiFi controller 245 may be implemented (in part or wholly) as computer program code 232, such that the one or more memories 225 and the computer program code 232 are configured, with the one or more processors 220, to cause the AP 130 to perform techniques presented herein. In another exemplary embodiment, the WiFi controller 245 may be (in part or wholly) implemented as hardware logic, such as being implemented in an integrated circuit, programmable logic device, or the like. The hardware logic may be part of the one or more processors 220 or separate circuitry. In an example, the AP 130-1 uses the one or more network interfaces 210 to access a network (such as a LAN to the Internet or the Internet) using link(s) 228.

The one or more network interfaces 265, 210 communicate over different types of networks, such as USB (Universal Serial Bus), Bluetooth, or wired LAN as examples. In an example, the AP 130 uses the one or more network interfaces 210 to access a network (such as the Internet).

The STAs 140 may be any type of wireless device, such as smartphones, conventional cell phones, computer systems, tablets, as examples. The APs 130 may be any access device providing access to a network.

The computer readable memories 255, 225 may be of any type suitable to the local technical environment and may be implemented using any suitable data storage technology, such as semiconductor based memory devices, flash memory, magnetic memory devices and systems, optical memory devices and systems, fixed memory and removable memory. The processors 250, 220 may be of any type suitable to the local technical environment, and may include one or more of general purpose computers, special purpose computers, general or special purpose integrated circuits, microprocessors, digital signal processors (DSPs) and processors based on a multi-core processor architecture, as non-limiting examples.

Returning to exemplary techniques proposed herein, the discussion starts with the fact that STAs measure the received signal power of Beacons prior to association. This received power is used for selection of APs to which the STAs should associate. In an exemplary embodiment, an additional field entitled "Received Power of Beacon" 310 (see FIG. 3) is proposed in the Probe Request frame 300. For the other fields in frame 300, see, e.g., section 8.3.3.9, "Probe Request frame format", of IEEE P802.11-REVmc/D1.6, September 2013. In additional exemplary embodiment, a new field entitled "Group ID based on Received Power" 410 (see FIG. 4) is also proposed in a Probe Response frame 400. For the other fields in frame 400, see, e.g., section 8.3.3.10, "Probe Response frame format", of IEEE P802.11-REVmc/D1.6, September 2013.

Figure 5:
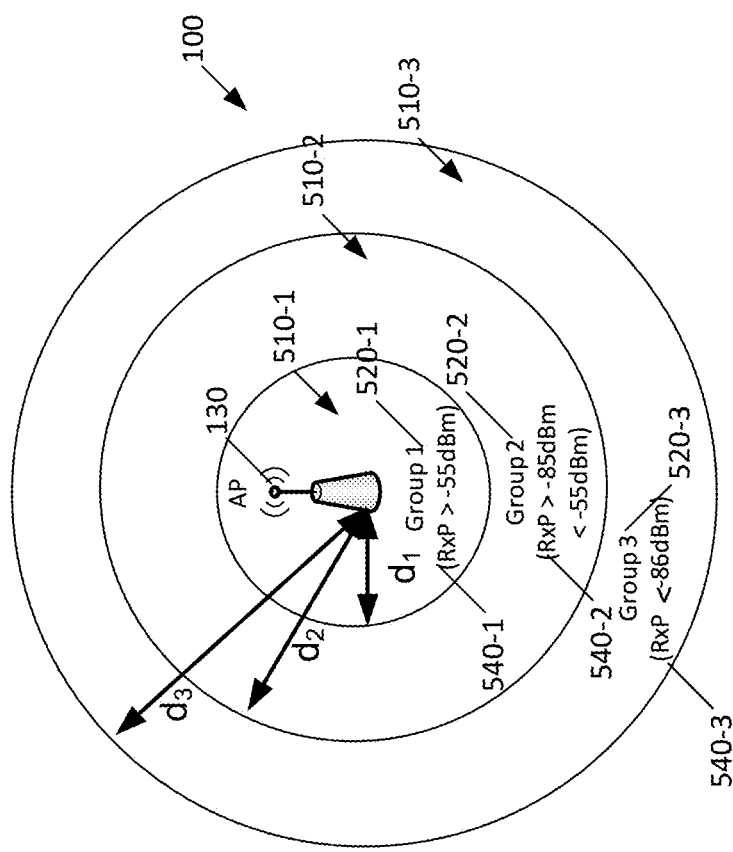
FIG. 5 is an example of grouping by an AP of a BSS based on received power of Beacons at STAs.

In other words, STAs 140 prior to association with their respective APs 130, measure received power from each Beacon frame and include the corresponding value (e.g., in dBm) as "Received Power of Beacon" 310 in the Probe Request frame 300. Based on this value received at the AP 130, the AP 130 decides on an appropriate Group ID for this STA and includes a value in the "Group ID" 410 in the Probe Response frame 400. FIG. 5 is an example of exemplary grouping by an AP 130 of a BSS 100 based on received power of Beacons at STAs 140 (the STAs 140 are not shown in FIG. 5). In this example, there are three groups 520-1, 520-2, and 520-3, each of which is associated with a received power (RxP) range 540. Group 1 520-1 is assigned to those STAs 140 having a RxP range 540-1 greater than −55 dBm, group 2 520-2 is assigned to those STAs 140 having a RxP range 540-2 less than (e.g., or equal to) −55 dBm but greater than −85 dBm, and group 3 520-3 is assigned to those STAs 140 having a RxP range 540-3 less than (e.g., or equal to) −85 dBm. Each group 520 corresponds to a transmission range 510 (e.g., a range from the AP 130 over which the AP 130 transmits), where transmission range 510-1 corresponds to a distance $d_1$, transmission range 510-2 corresponds to a distance $d_2$, and transmission range 510-3 corresponds to a distance $d_3$. It is noted that the transmission range 510-3 corresponds to the coverage area of the BSS 100 formed by the AP1 130, and the transmission ranges 510-1 and 510-2 correspond to portions (that is, less than all) of this coverage area.

The transmission range 510 of each group and the number of groups 520 are variables decided upon, e.g., by the AP 130. An exemplary motivation behind this grouping mechanism is that STAs 140 that are closer to the AP 130 may receive Beacons at considerably higher power when compared to STAs in the cell edge (e.g., near $d_3$). Hence, it is intuitive to group such STAs 140 with high received power and shrink the size of the group 520 accessing the communication medium.

Figure 6:
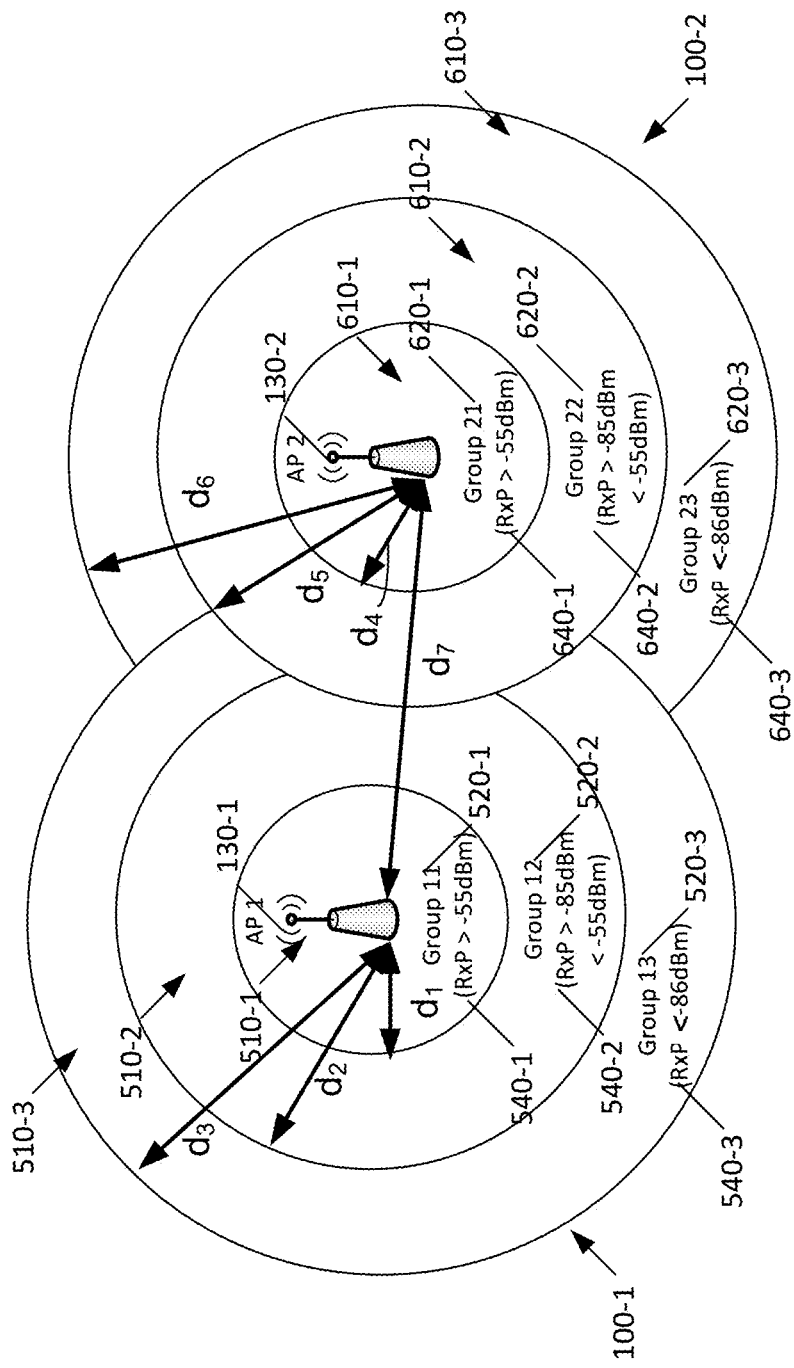
FIG. 6 is an example of an OBSS scenario between BSSs with AP1 and AP2 with the concept of grouping based on received power of Beacon frames.

An immediate advantage, turning to FIG. 6, is that overlapping BSSs (OBSSs) 100-1 and 100-2 may have an overlap, for instance, between STAs in Group 13 520-3 and Group 23 620-3 (and their corresponding transmission ranges 510-2 and 610-3) in FIG. 6 while not having an overlap between STAs in Groups 11 520-1 and 21 620-1 (and their corresponding transmission ranges 510-1 and 610-1). Hence, although one may have OBSSs to the BSS 100 shown in FIG. 5, multiple sets of Group 1 STAs may access the communication medium concurrently. More specifically, in the example of FIG. 6, the AP2 130-2 additionally has configured three groups 620-1, 620-2, and 620-3, each of which is associated with a corresponding RxP range 640-1, 640-2, and 640-3, respectively. For ease of reference, the RxP ranges 540 are the same as the RxP range 640, but this is merely exemplary. Consequently, group 1 620-1 is assigned to those STAs 140 having RxP greater than −55 dBm, group 2 620-2 is assigned to those STAs 140 having RxP less than (e.g., or equal to) −55 dBm but greater than −85 dBm, and group 3 620-3 is assigned to those STAs 140 having RxP less than (e.g., or equal to) −85 dBm. Each group 620 corresponds to a transmission range 610 (e.g., a range from the AP 130-2 over which the AP 130-2 transmits), where transmission range 610-1 corresponds to a distance $d_4$, transmission range 610-2 corresponds to a distance $d_5$, and transmission range 610-3 corresponds to a distance $d_6$. The distance between the two APs 130-1 and 130-2 is $d_7$. The transmission ranges 510 and 610 may be different.

In these OBSSs 100-1 and 100-2, the groups 520-1 and 620-1 may have access to the communication medium simultaneously. Exemplary signaling that can enable these concurrent data transmissions is explained below.

Figure 7:
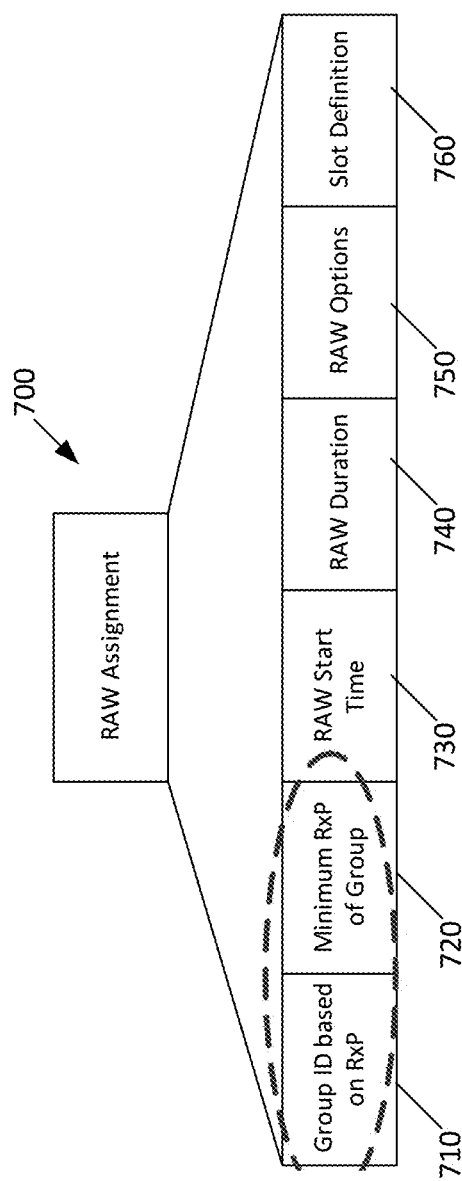
FIG. 7 is an example of a modified RAW assignment in accordance with an exemplary embodiment.

The restricted access window (RAW) concept has been accepted in the IEEE 802.11ah Standard as the major medium access mechanism. FIG. 7 is an example of a modified RAW assignment 700 in accordance with an exemplary embodiment. The RAW assignment is a field in a frame format for a RAW Parameter Set information element. The assignment 700 includes a "Group ID based on RxP" field 710, a "Minimum RxP of Group" field 720, a "RAW Start Time" field 730, a "RAW Duration" field 740, a "RAW Options" field 750, and a "Slot Definition" field 760. It should be noted that values for the RAW Start Time field 730 and RAW Duration field 740 define a period that may be used by STAs (having the Group ID in the Group ID based on RxP field 710) to access the WiFi communication medium.

This figure shows an exemplary RAW Parameter Set (RPS) information element within a Beacon or probe response frame in 802.11ah that is included in every beacon indicating the RAW Group allowed to contend for the communication medium, the group's RAW Start Time, and RAW Duration. For additional information regarding the RPS information element and the fields 730, 740, 750, and 760, see section 8.4.2.170b, "RPS element" of IEEE P802.11a/D1.0, October 2013. It is proposed in an exemplary embodiment that this RAW Group is the "Group ID based on RxP" field 710 with their corresponding RAW Start Time and Duration. A same group may be allocated multiple RAWs or a single RAW. Additionally, in another exemplary embodiment it is proposed to include a "Minimum RxP of Group" field 720 corresponding to the Group ID allocated a RAW. An exemplary idea behind inclusion of the "Group ID based on RxP" field 710 and the "Minimum RxP of Group" field 720 in the RPS element (e.g., the RAW assignment 700) is that a BSS of a set of OBSSs may receive this Beacon with the RPS element and decode the RAWs that are assigned to its non-overlapping (based on Group ID and Minimum RxP of Group fields) group in the BSS. For instance, Group 11 may operate concurrently with Group 21 or Group 22, but not with Group 23. This concurrent operation is described above with respect to FIG. 6 and also described in more detail below.

Before proceeding with addition description of concurrent operation, exemplary embodiments herein also provide proposals for conditions for non-overlapping region determination. For instance, regarding AP1 130-1 and AP2 130-2 simultaneous operating regions, as shown in FIG. 6, Group 11 520-1 can coexist with Group 21 620-1 and Group 22 620-2. That is, the STAs in Group 11 520-1, in Group 21 620-1, and in Group 22 620-2 can access the communication medium simultaneously with reduced mutual interference (e.g., −95 dBm). The condition for simultaneous operating regions should be such that the received power in both the BSSs is above receiver (e.g., Rx 262 in FIG. 2) sensitivity.

In case the STAs 140 and APs 130 are equipped with GPS (global positioning system) or indoor positioning systems, then the condition for non-overlapping region determinations is provided as follows in this example: Distance between AP1 and AP2>Transmission range for Group 2x+Transmission range of Group 1x, where "x" represents any specific group under AP1 or AP2. For example, the distance between the AP1 and AP2 in FIG. 6 is $d_7$, the transmission range 510-1 of Group 11 is $d_1$, the transmission range 610-1 of Group 21 is $d_4$, and it can be seen that $d_7>d_1+d_4$. A transmission range may be determined by using the farthest STA from an AP whose received power of beacon falls within the power range for one of the groups. Thus, the condition is met and concurrent transmission (between STAs in Groups 11 and 21) may take place. Similarly, the transmission range 510-1 of Group 11 is $d_1$, the transmission range 610-2 of Group 22 is $d_5$, and it can be seen that $d_7>d_1+d_5$. The condition is met and concurrent transmission (between STAs in Groups 11 and 22) may take place. However, the transmission range 510-1 of Group 11 is $d_1$ while the transmission range 610-3 of Group 23 is $d_6$, and it can be seen that $d_7<d_1+d_6$. The condition is not met and concurrent transmission (between STAs in Groups 11 and 23) should not take place.

If there is no availability of GPS or indoor positioning systems, then the condition may be computed as follows. First, an example is presented where both the APs 130 are using the same operating mode and it is assumed that each AP sets its own threshold and the STA needs to respect its BSS threshold as well as the OBSS threshold (assuming the STA 140 receives the beacon from the OBSS). It is left to implementation as to how AP1 or AP2 sets the threshold but rules for channel access are imposed. For instance, the rules may be that received power (RxP) from AP1 is less than an AP1_RxP_ threshold (e.g., indicated in Minimum RxP of Group filed 720 by AP1) and received power, RxP, from AP2 is greater than AP2_RxP_threshold (e.g., indicated in Minimum RxP of Group filed 720 by AP2) in order for a STA in BSS 2 to contend for a communication medium.

As an example, assume that AP1 130-1 advertises Group 11 access by indicating the minimum RxP (e.g., in field 720 described above) threshold of −55 dBm. This means that any STA 140 in Group 11 may access the communication medium, but STAs 140 in Groups 12 and 13 may not. The AP2 130-2 receives the beacon from AP1 at a power less than the indicated value of −55 dBm. Based on at least that power, the AP 130-2 can set a minimum RxP threshold of, e.g., −55 dBm.

In practice, AP2 (assuming AP2 receives a beacon from AP1) can estimate the path loss (and hence the distance from AP1) and then based on the AP1_RxP_threshold, the AP2 knows the desired coverage range of the AP1 transmission group. Based on this information, AP2 can set its desired transmit power and AP2_RxP_threshold so that the users scheduled in its own group are outside the coverage range of the AP1 transmission group. However, given the channel variability caused by a wireless medium, this might be difficult to do perfectly so usually an interference margin should be used, although this is more of an implementation issue.

Hence, both the BSSs 100-1 and 100-2 can simultaneously re-use the communication medium for a subset of each of their STAs. It is also possible that AP2 adjusts its transmit power in order to reduce its coverage range to allow access to only STA's that do not interfere with the transmission in BSS1. The AP can also indicate channel access margin which would indicate that only STA's that receive the transmission from the AP at a value higher than the minimum receiver sensitivity by a margin above than the indicated value can access the channel. For instance, instead of indicating −55 dBm, the AP might indicate a margin of 27 dB in which case only STA's which receive the beacon from AP at a value=minimum_Rx_sensitivity+channel_access_margin=−82+27=−55 dB can access the channel assuming a minimum receiver sensitivity of −82 dBm at 20 Mhz.

If the condition is satisfied, the APs may conclude that the regions are non-overlapping between a BSS and an OBSS and schedule RAWs concurrently. For instance, a same RAW with identical Start Time and Duration may be scheduled for Group 11 and Group 21 or for Group 22. However, due to the condition not being satisfied for Groups 11 and 23, they may not share the same RAW times.

Figure 8:
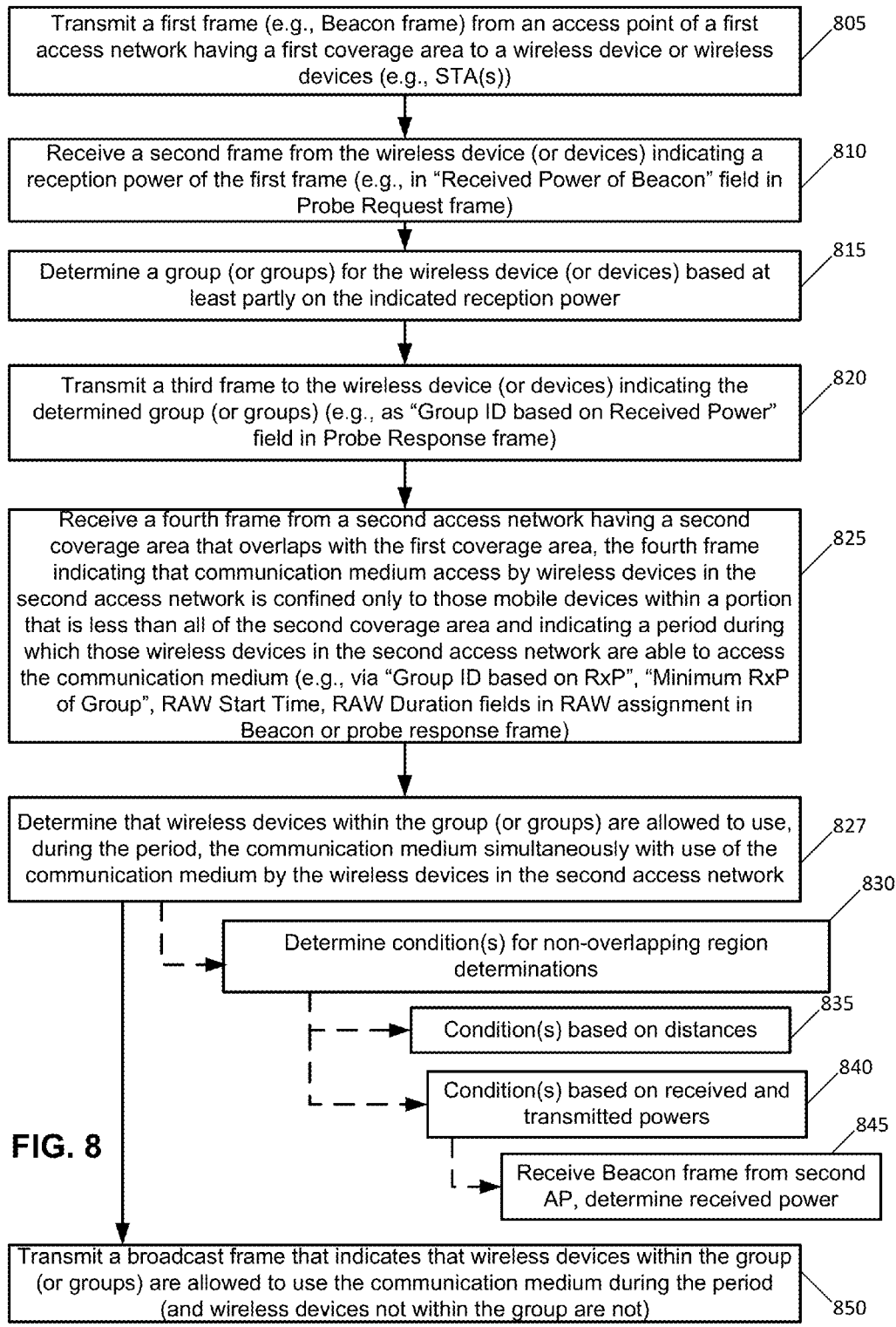
FIG. 8 is a block diagram of an exemplary logic flow diagram performed by an access point for solving exposed terminal problems and mitigating OBSS in densely deployed WLAN networks, and that illustrates the operation of an exemplary method, a result of execution of computer program instructions embodied on a computer readable memory, and/or functions performed by logic implemented in hardware, in accordance with exemplary embodiments herein.

Turning to FIG. 8, a block diagram is shown of an exemplary logic flow diagram performed by an access point for solving exposed terminal problems and mitigating OBSS in densely deployed WLAN networks. FIG. 8 also illustrates the operation of an exemplary method, a result of execution of computer program instructions embodied on a computer readable memory, and/or functions performed by logic implemented in hardware, in accordance with exemplary embodiments herein. The blocks in FIG. 8 may be considered to be interconnected means for performing the functions in the blocks. FIG. 8 is assumed to be performed by an AP 130, e.g., under control at least in part of the WiFi controller 245.

In block 805, the AP 130 (such as AP 130-2) transmits a first frame (e.g., comprising a beacon frame, or a probe response or both a beacon frame and a probe response) from an access point of a first access network having a first coverage area to a wireless device 140 or wireless devices 140 (e.g., STA(s)). In block 810, the AP 130 receives a second frame from the wireless device 140 (or devices 140) indicating a reception power of the first frame. As described in reference to FIG. 3, this may be received using a "Received Power of Beacon" field 310 in a Probe Request frame 300. In block 815, the AP 130 determines a group 520, 620 (or groups 520, 620) for the wireless device 140 (or devices 140) based at least partly on the indicated reception power. An algorithm for determining the groups can be simple. For instance, the higher the received power, the closer are the STAs to the AP and the AP groups these STAs into one group. The lower the received power, chances are that the STAs are further away from the AP and are grouped together.

In block 820, the AP 130 transmits a third frame to the wireless device 140 (or devices 140) indicating the determined group 520, 620 (or groups 520, 620). The third frame may be at least one of a probe response frame or an association response frame, which means that the third frame may comprise a probe response frame, an association response, or both the probe response frame and the association response. This is illustrated in FIG. 4, e.g., as the "Group ID based on Received Power" field 410 in Probe Response frame 400.

The AP 130, in block 825, receives a fourth frame from a second access network having a second coverage area that overlaps with the first coverage area. The fourth frame indicates that communication medium access by wireless devices in the second access network is confined only to those mobile devices within a portion that is less than all of the second coverage area and indicates a period during which those wireless devices in the second access network are able to access the communication medium. For instance, AP2 130-2 can receive the RAW assignment 700 shown in FIG. 7. The "Group ID based on RxP" and the "Minimum RxP of Group" indicates that communication medium access by wireless devices 140 in the second access network (e.g., BSS 100-1) is confined only to mobile devices 130 within a portion that is less than all of the second coverage area. As explained above in an example, the wireless devices 140 that are allowed to access the communication medium in the coverage area of the AP 130-1 are those wireless devices in the transmission range 510-1 for group 520-1 (and the wireless devices outside this transmission range 510-1, e.g., not in group 520-1, are not allowed to access the communication medium) for a period. The period may be defined by the values in the RAW Start Time field 730 and the RAW Duration field 740 in the RAW assignment 700 in, e.g., Beacon or probe response frames.

In block 827, the AP 130 (e.g., AP 130-2) determines that wireless devices 140 within the group (e.g., 620) are allowed to use, during the period, the communication medium simultaneously with use of the communication medium by the wireless devices 130 in the second access network (e.g., BSS 100-1). For example, the AP1 30-1 may indicate that only Group 11 520-1 will be allowed to access the communication medium during the period. The AP 130-2 can therefore allow wireless devices in both Groups 21 620-1 and 22 620-2 to use the communication medium simultaneously with the access of the communication medium by the wireless devices in Group 11 520-1. As a further example, the AP1 130-1 may indicate that both Groups 11 520-1 and 12 520-2 will be allowed to access the communication medium during the period. For instance, using the values in the Group ID and Minimum RxP fields 710 and 720, STAs with AP1 decoding the beacon with the RPS element (RAW assignment field) will be indicated whether the STAs are allowed to contend for the channel or not. STAs in BSS 2 under AP 2 would know the Minimum Rx_P of the Group via field 720 that has been scheduled in the RAW. Groups of STAs with AP2 away from the Minimum Rx_P are allowed to access the channel simultaneously with significantly less mutual interference. The AP 130-2 can therefore allow wireless devices in Group 21 620-1 to use the communication medium simultaneously with the access of the communication medium by the wireless devices in Groups 11 and 12.

As described above, one way to perform block 827 is via block 830, where the AP 130-2 determine condition(s) for non-overlapping region determinations. The condition(s) may be determined based on distances (block 835) or based on received and transmitted powers (block 840), as described above. It is noted that, for this and all other examples herein, a node may be able to transmit based on minimum received power and the node is allowed to transmit if the received power is greater than the minimum received power. However, this can also be written that a node is allowed to transmit if its received power is less than one threshold and greater than another threshold (e.g., greater than −82 dBm and less than −55 dBm as illustrated in FIG. 6 for instance). In such case, the OBSS can perform exemplary techniques herein based on the −85 dBm threshold (i.e., the lower value). In order to perform block 840, the AP 130-2 may receive (block 845) a Beacon frame from a second AP 130-1, which allows determination of the received power of the AP 130-1 (referred to as RxP_AP1_AP2 above).

In block 850, the AP 130 transmits a broadcast frame that indicates that wireless devices within the group (or groups) are allowed to use the communication medium during the period (and wireless devices not within the group are not). For instance, the RAW assignment shown in FIG. 7 indicates that wireless devices within the group (or groups) indicated by the value(s) in the "Group ID based on RxP" field 720 are allowed to use the communication medium. Note that it may be that the field 720 could contain indications of multiple groups (if multiple groups are used) or it could be that an indication of one group subsumes another group or groups. For instance, an indication of Group 22 could imply that both Groups 21 and 22 are allowed to use the communication medium. Furthermore, the indication of Group 21 (or 22) in the field 720 further indicates that Groups 22 and 23 (or 23, respectively) are not allowed to use the communication medium. The period may be indicated by the "RAW Start Time" field 730 and the "RAW Duration 740" field 740, although other options are possible.

Figure 9:
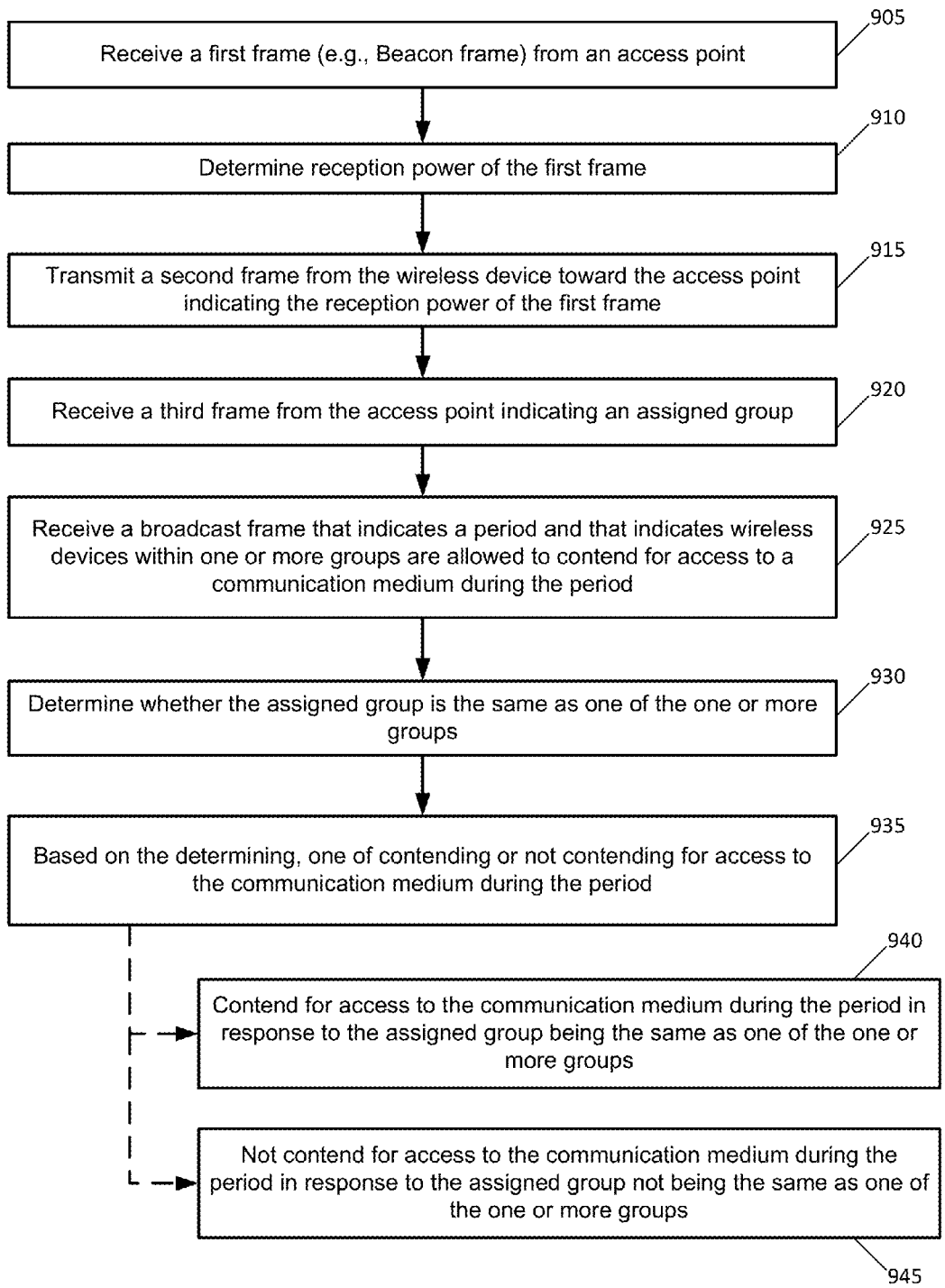
FIG. 9 is a block diagram of an exemplary logic flow diagram performed by a station for solving exposed terminal problems and mitigating OBSS in densely deployed WLAN networks, and that illustrates the operation of an exemplary method, a result of execution of computer program instructions embodied on a computer readable memory, and/or functions performed by logic implemented in hardware, in accordance with exemplary embodiments herein.

Refer now to FIG. 9, which is a block diagram of an exemplary logic flow diagram performed by a station for solving exposed terminal problems and mitigating OBSS in densely deployed WLAN networks. FIG. 9 further illustrates the operation of an exemplary method, a result of execution of computer program instructions embodied on a computer readable memory, and/or functions performed by logic implemented in hardware, in accordance with exemplary embodiments herein. The blocks in FIG. 9 may be considered to be interconnected means for performing the functions in the blocks. FIG. 9 is assumed to be performed by a wireless device (e.g., STA) 140, e.g., under control at least in part of the WiFi controller 230.

In block 905, the wireless device 140 receives a first frame (e.g., Beacon frame) from an access point. In block 910, the wireless device 140 determines reception power of the first frame. The reception power may be measured, e.g., using the simple energy detection technique. In block 915, the wireless device 140 transmits a second frame (e.g., comprising a probe request frame, or an association request, or both a beacon frame and an association request) from the wireless device toward the access point indicating the reception power of the first frame. As explained above, the wireless device 140 could put a value of received power in the "Received Power of Beacon" field in the Probe Request frame 300. In block 920, the wireless device 140 receives a third frame from the access point indicating an assigned group. As described above, the wireless device 140 can receive the Probe Response frame 400, which includes the "Group ID based on Received Power" field 410, a value of which indicates the assigned group.

In block 925, the wireless device 140 receives a broadcast frame that indicates a period and that indicates wireless devices within one or more groups are allowed to contend for access to a communication medium during the period. As described above, the RAW Assignment 700 may be received, which includes the "Group ID based on RxP" field 710. The value in the field 710 indicates the one or more groups that are allowed to contend for access to a communication medium during the period. The period in this example may be defined at least by the values in the "RAW Start Time" and "RAW Duration" fields 730, 740, respectively.

In block 930, the wireless device 130 determines whether the assigned group (e.g., from the "Group ID based on Received Power" field 410) is the same as one of the one or more groups (e.g., from the "Group ID based on RxP" field 710) indicated in the broadcast frame. The wireless device 130 in block 935, based on the determining, one of contends or not contends for access to the communication medium during the period. That is, in block 940, the wireless device 130 contends for access to the communication medium during the period in response to the assigned group being the same as one of the one or more groups. In block 945, the wireless device 130 does not contend for access to the communication medium during the period in response to the assigned group not being the same as one of the one or more groups.

Figure 10:
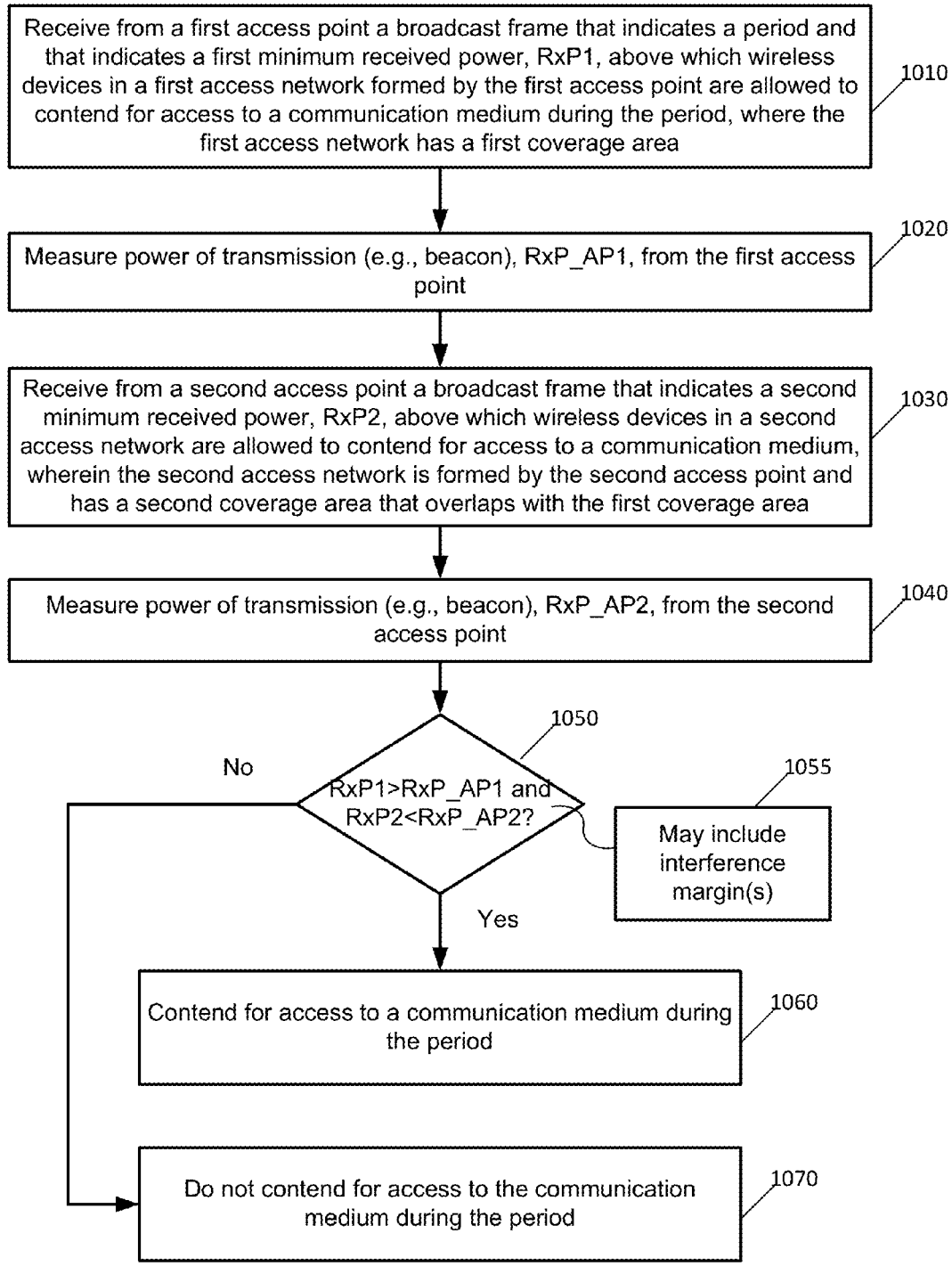
FIG. 10 is a block diagram of an exemplary logic flow diagram performed by a station for solving exposed terminal problems and mitigating OBSS in densely deployed WLAN networks, and that illustrates the operation of an exemplary method, a result of execution of computer program instructions embodied on a computer readable memory, and/or functions performed by logic implemented in hardware, in accordance with exemplary embodiments herein.

For FIGS. 8 and 9, a group is assumed to be used by a STA in BSS2 in order to determine whether the STA should contend for access to the communication medium or not. However, it is also possible that the STA in BSS2 would use thresholds of BSS1 and BSS2 and received powers from AP1 and AP2 in order to determine whether to contend for access to the communication medium or not. Turning to FIG. 10, this figure is a block diagram of an exemplary logic flow diagram performed by a station for solving exposed terminal problems and mitigating OBSS in densely deployed WLAN networks. FIG. 10 illustrates the operation of an exemplary method, a result of execution of computer program instructions embodied on a computer readable memory, and/or functions performed by logic implemented in hardware, in accordance with exemplary embodiments herein. The blocks in FIG. 10 may be considered to be interconnected means for performing the functions in the blocks. FIG. 10 is assumed to be performed by a STA 140 in BSS2.

In block 1010, the STA 140 receives from a first access point a broadcast frame that indicates a period and that indicates a first minimum received power, RxP1, above which wireless devices in a first access network (e.g., BSS2 100-2 in this example) formed by the first access point (e.g., AP2 in this example) are allowed to contend for access to a communication medium during the period. The first access network has a first coverage area. In block 1020, the STA 140 measures power of transmission (e.g., beacon), RxP_AP1, from the first access point (AP2). In block 1030, the STA 140 receives from a second access point (e.g., AP1 in this example) a broadcast frame that indicates a second minimum received power, RxP2, above which wireless devices in a second access network are allowed to contend for access to a communication medium. The second access network (e.g., BSS1 100-1) is formed by the second access point and has a second coverage area that overlaps with the first coverage area.

In block 1040, the STA 140 measures power of transmission (e.g., beacon), RxP_AP2, from the second access point (e.g., AP1). In block 1050, the STA performs two comparisons. Specifically, it is determined if the minimum received power RxP1 indicated by AP2 is greater than the power of transmission of AP2 (illustrated as RxP_AP1) and if the minimum received power RxP2 indicated by AP1 is less than the power of transmission of AP1 (e.g., RxP_AP2). If so (block 1050=Yes), then the STA 140 in block 1060 contends for access to a communication medium during the period. If not (block 1050=No), then the STA 140 in block 1070 does not contend for access to the communication medium during the period. In practice, it is possible that there is an interference margin, so there may be one or more interference margins added in block 1055. For instance, the formula in block 1050 may be RxP1>RxP_AP1 and RxP2<RxP_AP2-interference margin or RxP1>RxP_AP1—interference margin and RxP2<RxP_AP2.

The above description has assumed both BSS are operating in the same operational mode, e.g., where both BSSs 100 use RAWs. However, it is also possible for one BSS (e.g., BSS1 100-1) to use RAWs, while the other BSS (e.g., BSS2 100-2) of the OBSS does not use RAWs. Thus, it is possible one BSS is operating in that RAW mode and the other is not, in which case the operating principles of the overlapping BSS should be respected. An exemplary idea is that a STA in BSS2 can re-use the channel if the STA does not cause significant interference to BSS1. This considers mostly uplink transmissions from the STA to the AP and assumes some form of channel reciprocity so the Rx threshold indicated by the AP is an indication of the desired coverage range of the AP for the scheduled group. Thus, if there are STAs outside the coverage range, these STAs could transmit to their AP.

Figure 11:
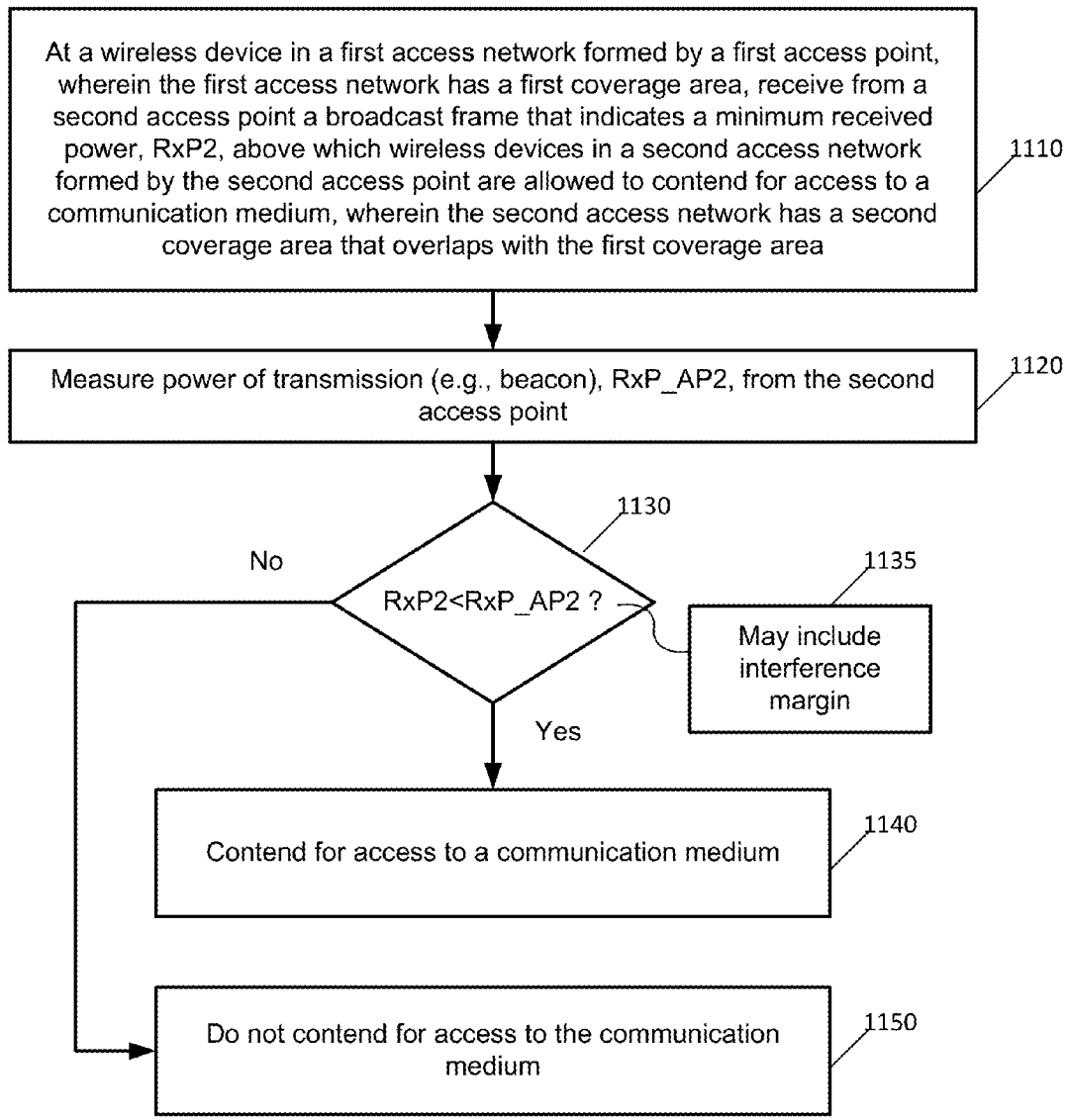
FIG. 11 is a block diagram of an exemplary logic flow diagram performed by a station for solving exposed terminal problems and mitigating OBSS in densely deployed WLAN networks, and that illustrates the operation of an exemplary method, a result of execution of computer program instructions embodied on a computer readable memory, and/or functions performed by logic implemented in hardware, in accordance with exemplary embodiments herein.

Referring now to FIG. 11, FIG. 11 is a block diagram of an exemplary logic flow diagram performed by a station for solving exposed terminal problems and mitigating OBSS in densely deployed WLAN networks. This figure illustrates the operation of an exemplary method, a result of execution of computer program instructions embodied on a computer readable memory, and/or functions performed by logic implemented in hardware, in accordance with exemplary embodiments herein. The blocks in this figure may be assumed to be interconnected means for performing the functions.

In block 1110, at a wireless device (e.g., a STA 140) in a first access network (e.g., BSS2 100-2) formed by a first access point (e.g., AP2 130-2), receives from a second access point (e.g., AP1 130-1) a broadcast frame that indicates a minimum received power, RxP2, above which wireless devices in a second access network (e.g., BSS1 100-1) formed by the second access point are allowed to contend for access to a communication medium. The first access network has a first coverage area and the second access network has a second coverage area that overlaps with the first coverage area. In block 1120, the STA 140 measures power of transmission (e.g., beacon), RxP_AP2, from the second access point (e.g., AP1). Assume, for instance, the measured power is −55 dBm.

In block 1130, the STA compares RxP2 and RxP_AP2. Specifically, the STA 140 determines if the minimum received power, RxP2, is less than the power of transmission from AP1, RxP_AP2. If so (block 1130=Yes), the STA 140 in block 1140 contends for access to a communication medium. If not (block 1130=No), the STA 140 does not contend for access to the communication medium.

In practice, it is possible that there is an interference margin (see block 1135) so all STAs 140 in any Group 2x may be allowed to transmit if their receive power from AP1 is slightly lower than the minimum value indicated by AP1 for its own STAs, e.g., in the above example, RxP_Group2x is less than −55 dBm—interference margin. As an example, if the interference margin is 10 dBm, then only STAs belonging to AP2 can simultaneously access the channel if a STA receives the beacon from AP1 at a power less than −55-10=−65 dBm.

It is noted that, for FIGS. 10 and 11, the RxP1 and RxP2 may be thresholds indicated by respective AP2 and AP1 using, e.g., a Minimum RxP of Group field 720 in FIG. 7. Also, in FIG. 11, the AP2 is assumed to not divide STAs 140s into groups, although this is still possible.

It has been assumed above of symmetry in traffic direction, i.e., both STA1 and STA2 need to transmit in the uplink to AP1 and AP2, respectively. I think you have added a few lines as per our discussion. It should be noted that it is possible to take into account the restriction for instance. STA2 can take into account the transmission is from STA1 to AP1 (and not from AP1 to STA1 so STA2's OBSS measurements was with respect to AP1 and not STA1) when STA2 is reusing the channel which STA2 can infer from the RAW allocation. Basically, the received power comparisons are being done with respect to the intended recipient, which in this example is AP1 as the intended recipient for the transmission from STA1 so STA2 should not cause too much interference at AP1.

Transmission and reception may be performed herein using known techniques under IEEE standards such as IEEE 802.11 to 13 and the like.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 2. A computer-readable medium may comprise a computer-readable storage medium (e.g., memory(ies) 255, 225 or other device) that may be any media or means that can contain or store the instructions for use by or in connection with an instruction execution system, apparatus, or device, such as a computer. However, the computer-readable storage medium dos not encompass propagating signals.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

AP Access Point
BSS Basic Service Set
dB decibels dBm decibel-milliwatts, a power ratio in dB of measured power referenced to one milliwatt
CCA Clear Channel Assessment
Gbps Gigabits per second
GPS Global Positioning System
HEW High Efficiency WLAN
IEEE Institute of Electrical and Electronics Engineers
LAN Local Area Network
OBSS Overlapping BSS
RAW Restricted Access Window
RPS RAW Parameter Set
Rx Receiver
RxP Received Power
STA Station, a wireless device
Tx Transmitter
TxP Transmitted Power
UL uplink
WiFi or WiFi Wireless Fidelity, a wireless local area network (and products) that are based on IEEE 802.11 and other standards
WLAN Wireless LAN

What is claimed is:

1. An apparatus, comprising:
one or more processors; and
one or more memories including computer program code, the one or more memories and the computer program code configured, with the one or more processors, to cause the apparatus to perform at least the following:
transmitting a first frame from an access node of a first access network having a first coverage area to a wireless device;
receiving a second frame from the wireless device indicating a reception power of the first frame;
determining a group for the wireless device based at least partly on the indicated reception power;
transmitting a third frame to the wireless device indicating the determined group;
receiving a fourth frame from a second access network having a second coverage area that overlaps with the first coverage area, the fourth frame indicating that communication medium access by wireless devices in the second access network is confined to a subset of wireless devices of the second access network wherein the subset has a third coverage area smaller than the second coverage area and indicating a period during which the those wireless devices in the second access network are able to access the communication medium;
determining that wireless devices within the group are allowed to use, during the period, the communication medium simultaneously with use of the communication medium by those wireless devices in the second access network; and
transmitting a broadcast frame that indicates that wireless devices within the group are allowed to use the communication medium during the period.

2. The apparatus of claim 1, wherein the first frame comprises a beacon frame, or a probe response, or both a beacon frame and a probe response.

3. The apparatus of claim 1, wherein the second frame comprises a probe request frame, or an association request, or both a probe request frame and an association request, and wherein the second frame comprises a field having a value indicating the reception power.

4. The apparatus of claim 1, wherein the third frame comprises a probe response frame, or an association response, or both a probe response frame and an association response, and wherein the third frame comprises a group identification field having a value indicating the determined group.

5. The apparatus of claim 1, wherein the fourth frame indicates that communication medium access by the wireless devices in the second access network is confined only to those mobile devices within a portion that is less than all of the second coverage area at least by comprising a field having a value indicating one or more groups in the second access network that are allowed to access the communication medium and a field having a value indicating a minimum reception power for one of the one or more groups in the second access network, and wherein the one or more groups in the second access network are less than all of the groups in the second access network.

6. The apparatus of claim 1, wherein the fourth frame indicates a period during which those wireless devices in the second access network are able to access the communication medium by comprising a field having a value indicating a restricted access window start time and a field having a value indicating a restricted access window duration.

7. The apparatus of claim 1, wherein determining that wireless devices within the group are allowed to use, during the period, the communication medium simultaneously with use of the communication medium by those wireless devices in the second access network further comprises determining a condition for non-overlapping region determinations between regions in the first access network and the second access network.

8. The apparatus of claim 7, wherein the condition is defined so that wireless devices in simultaneous operating regions in the first access network and the second access network have received power from their respective access network above receiver sensitivity and can access the communication medium.

9. The apparatus of claim 8, wherein the received power is a range of received powers between a low value and a high value.

10. The apparatus of claim 7, wherein the condition comprises the following:
distance between AP1 and AP2>transmission range for Group 2x+transmission range of Group 1x, wherein AP1 is an access node for the first access network, AP2 is an access node for the second access network, Group 1x is a group in the first access network, Group 2x is a group in the second access network, the transmission range for Group 1x is a distance from the AP1 to a wireless device that is in a group in the first access network but whose received power falls within a power range for a group in the first access network, and the transmission range for Group 2x is a distance from the AP2 to a wireless device that is in a group in the second access network but whose received power falls within a power range for the group in the second access network.

11. A method, comprising:
transmitting a first frame from an access node of a first access network having a first coverage area to a wireless device;
receiving a second frame from the wireless device indicating a reception power of the first frame;
determining a group for the wireless device based at least partly on the indicated reception power;
transmitting a third frame to the wireless device indicating the determined group;
receiving a fourth frame from a second access network having a second coverage area that overlaps with the first coverage area, the fourth frame indicating that communication medium access by wireless devices in the second access network is confined to a subset of wireless devices of the second access network wherein the subset has a third coverage area smaller than the second coverage area and indicating a period during which the those wireless devices in the second access network are able to access the communication medium;

determining that wireless devices within the group are allowed to use, during the period, the communication medium simultaneously with use of the communication medium by those wireless devices in the second access network; and transmitting a broadcast frame that indicates that wireless devices within the group are allowed to use the communication medium during the period.

12. The method of claim 11, wherein the first frame comprises a beacon frame, or a probe response, or both a beacon frame and a probe response.

13. The method of claim 11, wherein the second frame comprises a probe request frame, or an association request, or both a probe request frame and an association request, and wherein the second frame comprises a field having a value indicating the reception power.

14. The method of claim 11, wherein the third frame comprises a probe response frame, or an association response, or both a probe response frame and an association response, and wherein the third frame comprises a group identification field having a value indicating the determined group.

15. The method of claim 11, wherein the fourth frame indicates that communication medium access by the wireless devices in the second access network is confined only to those mobile devices within a portion that is less than all of the second coverage area at least by comprising a field having a value indicating one or more groups in the second access network that are allowed to access the communication medium and a field having a value indicating a minimum reception power for one of the one or more groups in the second access network, and wherein the one or more groups in the second access network are less than all of the groups in the second access network.

16. The method of claim 11, wherein the fourth frame indicates a period during which those wireless devices in the second access network are able to access the communication medium by comprising a field having a value indicating a restricted access window start time and a field having a value indicating a restricted access window duration.

17. The method of claim 11, wherein determining that wireless devices within the group are allowed to use, during the period, the communication medium simultaneously with use of the communication medium by those wireless devices in the second access network further comprises determining a condition for non-overlapping region determinations between regions in the first access network and the second access network.

18. The method of claim 17, wherein the condition is defined so that wireless devices in simultaneous operating regions in the first access network and the second access network have received power from their respective access network above receiver sensitivity and can access the communication medium.

19. The method of claim 18, wherein the received power is a range of received powers between a low value and a high value.

20. A computer program product comprising a non-transitory computer-readable medium bearing computer program code embodied therein for use with a computer, the computer program code comprising:

code for transmitting a first frame from an access node of a first access network having a first coverage area to a wireless device;

code for receiving a second frame from the wireless device indicating a reception power of the first frame;

code for determining a group for the wireless device based at least partly on the indicated reception power;

code for transmitting a third frame to the wireless device indicating the determined group;

code for receiving a fourth frame from a second access network having a second coverage area that overlaps with the first coverage area, the fourth frame indicating that communication medium access by wireless devices in the second access network is confined to a subset of wireless devices of the second access network wherein the subset has a third coverage area smaller than the second coverage area and indicating a period during which the those wireless devices in the second access network are able to access the communication medium;

code for determining that wireless devices within the group are allowed to use, during the period, the communication medium simultaneously with use of the communication medium by those wireless devices in the second access network; and code for transmitting a broadcast frame that indicates that wireless devices within the group are allowed to use the communication medium during the period.

* * * * *